(12) United States Patent
Trajkovic et al.

(10) Patent No.: US 7,158,126 B2
(45) Date of Patent: Jan. 2, 2007

(54) ACOUSTIC BASED POINTING DEVICE

(75) Inventors: Miroslav Trajkovic, Ossining, NY (US); Antonio Colmenarez, Maracaibo (VE); Srinivas Gutta, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 634 days.

(21) Appl. No.: 10/117,851

(22) Filed: Apr. 8, 2002

(65) Prior Publication Data
US 2003/0189545 A1 Oct. 9, 2003

(51) Int. Cl.
G09G 5/00 (2006.01)

(52) U.S. Cl. .............. 345/177; 345/169; 178/19.02

(58) Field of Classification Search ........... 345/157, 345/169, 177, 7, 8, 159, 158, 156, 581; 356/620, 356/623; 704/236, 275; 702/103, 158, 159, 702/189; 707/100; 381/95, 96, 97, 315, 381/317; 178/18.04, 19.02; 341/27; 73/645; 367/197; 703/1–2; 600/522
See application file for complete search history.

(56) References Cited

U.S. PATENT DOCUMENTS

| | | | | |
|---|---|---|---|---|
| 4,578,674 | A | 3/1986 | Baker et al. | 340/710 |
| 4,654,648 | A | 3/1987 | Herrington et al. | 340/710 |
| 4,862,152 | A | 8/1989 | Milner | 340/712 |
| 4,885,433 | A | 12/1989 | Schier | 178/19 |
| 5,046,097 | A * | 9/1991 | Lowe et al. | 381/17 |
| 5,144,594 | A * | 9/1992 | Gilchrist | 367/129 |
| 5,465,302 | A * | 11/1995 | Lazzari et al. | 381/92 |
| 5,469,193 | A | 11/1995 | Giobbi et al. | 345/158 |
| 5,546,515 | A * | 8/1996 | Mochizuki | 345/606 |
| 5,811,776 | A * | 9/1998 | Liu | 235/462.27 |
| 6,032,115 | A * | 2/2000 | Kanazawa et al. | 704/234 |
| 6,069,594 | A | 5/2000 | Barnes et al. | 345/7 |
| 6,424,843 | B1 * | 7/2002 | Reitmaa et al. | 455/566 |
| 6,476,762 | B1 * | 11/2002 | Valio et al. | 342/357.02 |
| 6,577,312 | B1 * | 6/2003 | Deering et al. | 345/428 |
| 6,633,280 | B1 * | 10/2003 | Matsumoto et al. | 345/173 |
| 6,723,929 | B1 * | 4/2004 | Kent | 178/18.04 |

FOREIGN PATENT DOCUMENTS

| | | | |
|---|---|---|---|
| JP | 62-119480 | * | 5/1987 |
| WO | WO9207346 | | 4/1992 |
| WO | WO9304424 | | 3/1993 |

\* cited by examiner

*Primary Examiner*—Richard Hjerpe
*Assistant Examiner*—Abbas Abdulselam
(74) *Attorney, Agent, or Firm*—Michael E. Belk; Paul Im

(57) ABSTRACT

An acoustic based pointing device and a system and method for using the pointing device to move a cursor on a display screen of a display device. The pointing device comprises an acoustic source that generates and propagates an acoustic signal that is detected by four microphones $M_1$, $M_2$, $M_3$, and $M_4$ and is then converted into corresponding periodic electrical signals $S_1$, $S_2$, $S_3$, and $S_4$. The position vector $\underline{P}_0$ of the acoustic source is calculated by solving triangulation equations that depend on phase-shift time delays between $S_1$ and $S_j$ for $j=1$, 2, and 3. A position vector $\underline{P}_C$ is calculated from $\underline{P}_0$ using a scale vector that relates a change in position of the cursor to a change in position of the acoustic source. Then the cursor is moved to a position $P_C$ associated with the position vector $\underline{P}_C$.

43 Claims, 1 Drawing Sheet

ACOUSTIC BASED POINTING DEVICE

BACKGROUND OF THE INVENTION

1. Technical Field

The present invention relates generally to a system and method for moving a cursor on a display screen, and more particularly to use of an acoustic based pointing device for moving the cursor on the display screen.

2. Related Art

A commercially available wireless pointing device exploits the gyroscopic effect. Consequently, such commercially available wireless pointing devices rely on the rotation of the pointing device which makes these pointing devices very unintuitive and inhibits the ability to track the positions of these pointing devices. Additionally, these pointing devices are fundamentally heavy since they need a large mass in order to exploit conservation of angular momentum.

Accordingly, there is a need for wireless pointing device that eliminate the aforementioned disadvantages of commercial wireless pointing devices that are currently available.

SUMMARY OF THE INVENTION

A first embodiment of the present invention provides a method for moving a cursor on a display screen, comprising:

providing a display device having the display screen;

providing four microphones $M_1$, $M_2$, $M_3$, and $M_4$ at fixed positions such that no three of $M_1$, $M_2$, $M_3$, and $M_4$ are colinear;

providing a wireless pointing device having an acoustic source;

moving the pointing device such that the acoustic source is moved to a position $P_0$ having an associated position vector $\underline{P}_0$, wherein $\underline{P}_0$ is yet to be calculated;

propagating an acoustic signal from the acoustic source;

detecting the acoustic signal at microphone $M_i$, for i=1, 2, 3, and 4;

converting the acoustic signal detected at microphone $M_i$ to a periodic electrical signal $S_i$, for i=1, 2, 3, and 4;

calculating $\underline{P}_0$ by solving triangulation equations that comprise a dependence on a phase-shift time delay between $S_1$ and $S_j$, for j=2, 3, and 4;

computing a position vector $\underline{P}_C$ for the cursor, wherein $\underline{P}_C$ depends on: $\underline{P}_0$, a scale vector $\underline{A}$, and a shape function of the display screen; and moving the cursor to a position $P_C$ associated with the position vector $\underline{P}_C$.

A second embodiment of the present invention provides a system for moving a cursor on a display screen, comprising:

a display device having the display screen;

four microphones $M_1$, $M_2$, $M_3$, and $M_4$ at fixed positions such that no three of $M_1$, $M_2$, $M_3$, and $M_4$ are colinear;

a wireless pointing device having an acoustic source, wherein the acoustic source is located at a position $P_0$ having an associated position vector $\underline{P}_0$, wherein the acoustic source is adapted to generate and propagate an acoustic signal, wherein the microphone $M_i$ is adapted to detect the acoustic signal, and wherein the acoustic signal detected at the microphone $M_i$ is adapted to be converted to a periodic electrical signal $S_i$, for i=1, 2, 3, and 4;

a computing system to which the cursor, $S_1$, $S_2$, $S_3$, and $S_4$ are each electrically coupled, wherein the computing system is adapted to calculate $\underline{P}_0$ by solving triangulation equations that comprise a dependence on a phase-shift time delay between $S_1$ and $S_j$, for j=2, 3, and 4, and wherein the computing system is adapted to compute a position vector $\underline{P}_C$ for the cursor such that $\underline{P}_C$ depends on: $\underline{P}_0$, a scale vector $\underline{A}$, and a shape function of the display screen; and means for moving the cursor to a position $P_C$ associated with the position vector $\underline{P}_C$.

A third embodiment of the present invention provides a pointing device, said pointing device being wireless and comprising an acoustic source at a position $P_0$ having an associated position vector $\underline{P}_0$:

wherein the acoustic source is adapted to generate and propagate an acoustic signal that can be detected by each of four microphones $M_1$, $M_2$, $M_3$, and $M_4$ at fixed positions such that no three of $M_1$, $M_2$, $M_3$, and $M_4$ are colinear;

wherein the acoustic signal at the microphone $M_i$ is adapted to be converted to a periodic electrical signal $S_i$ that is coupled to a computing system, for i=1, 2, 3, and 4;

wherein the computing system is adapted to calculate $\underline{P}_0$ by solving triangulation equations that comprise a dependence on a phase-shift time delay between $S_1$ and $S_j$, for j=2, 3, and 4; and wherein the computing system is adapted to compute a position vector $\underline{P}_C$ for a cursor on a display screen such that $\underline{P}_C$ depends on: $\underline{P}_0$, a scale vector $\underline{A}$, and a shape function of the display screen.

The present invention provides a pointing device that eliminates the disadvantages associated with commercial wireless pointing devices that are currently available. For example, the acoustic based pointing device of the present invention is or may be: wireless, accurate, lightweight, hand held, and easily tracked with respect to its motions and spatial positions. Additionally, the user is able to use the pointing device of the present invention in a way that is analogous to use of a conventional computer mouse with the added advantage that the pointing device of the present invention is wireless.

DETAILED DESCRIPTION OF THE INVENTION

Figure 1:
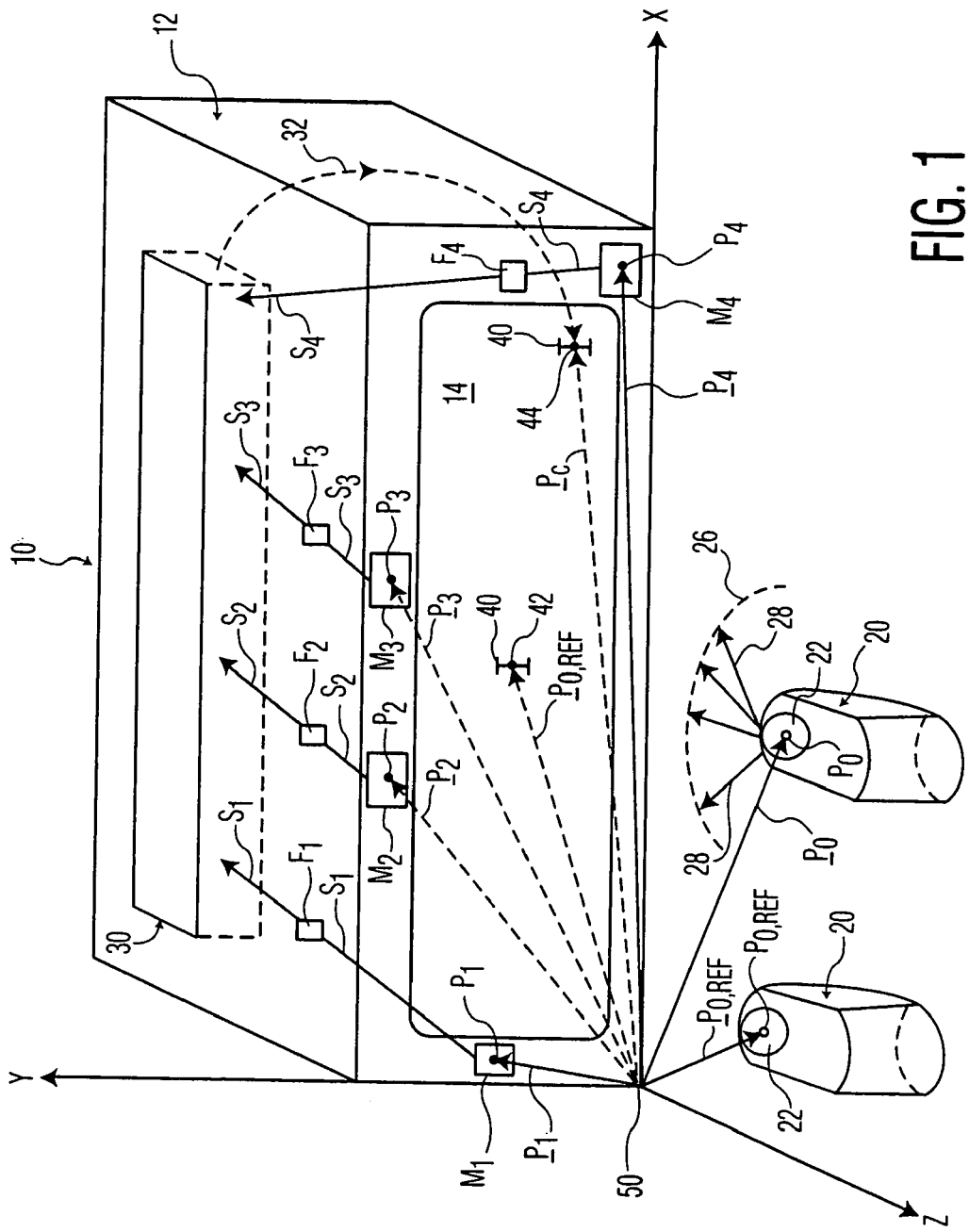
FIG. 1 depicts a three-dimensional view of a system for moving a cursor on a display screen of a display device, in accordance with embodiments of the present invention.

FIG. 1 illustrates a three-dimensional view of a system 10 for moving a cursor 40 on a display screen 14 of a display device 12, in accordance with embodiments of the present invention. FIG. 1 shows a three-dimensional Cartesian coordinate system having three mutually orthogonal axes identified as X, Y, and Z axes having a coordinate origin at the point 50. The Z axis is oriented in a "depth" direction into or out of the display screen 14 as perceived by a viewer who is viewing the display screen 14. The X and Y axes define a plane, namely the X-Y plane, such that the Z axis is normal to the X-Y plane If the display screen 14 has a planar shape, then the display screen 14 is parallel to the X-Y plane. The present invention accounts for the shape of the display screen 14, regardless of whether the display screen 14 is planar or non-planar. Any vector shown in FIG. 1 is a three dimensional vector having components along the X, Y, and Z axes. The system 10 comprises the display device 12, a pointing device 20, four microphones denoted as $M_1$, $M_2$, $M_3$, and $M_4$, and a computing system 30.

The display device 12 is capable of receiving an image in electronic form and displaying the image visually on the display screen 14. The display device 12 may comprise, inter alia, a television, a computer monitor, etc.

The pointing device 20 is capable of controlling motion of a cursor 40 on the display screen 14 of the display device 12. The pointing device 20 may comprise, inter alia, a mouse. The pointing device 20 includes an acoustic source 22 that is adapted to continuously generate and propagate an acoustic signal 28 (i.e., longitudinal acoustic waves) through the ambient atmosphere. The acoustic source 22 has an associated wave front 26. The acoustic source 22 is at a position $P_0$ with an associated position vector $\underline{P}_0$. FIG. 1 also shows the acoustic source 22 at a reference position $P_{0,REF}$ with an associated position vector $\underline{P}_{0,REF}$. Vectors $\underline{P}_0$ and $\underline{P}_{0,REF}$ each have a component along each of the X, Y, and Z axes.

The cursor 40 is at a position Pc having an associated position vector $\underline{P}_C$, as measured from the coordinate origin 50. The position Pc may be on the display screen 14, or "behind" the display screen 14 to simulate an apparent depth of the cursor 40 relative to the display screen 14. For the case of no apparent depth, Pc and $\underline{P}_C$ trace a path on the surface of the display screen 14 as the cursor 40 moves. FIG. 1 also shows the cursor 40 at a position that has an associated reference position vector $\underline{P}_{C,REF}$. For simplicity, $\underline{P}_{C,REF}$ may be chosen to be on the display screen 14. Vectors $\underline{P}_C$ and $\underline{P}_{C,REF}$ each have a component along each of the X, Y, and Z axes. $\underline{P}_{C,REF}$ corresponds to $\underline{P}_{0,REF}$ (i.e., the cursor 40 is at the reference screen position vector $\underline{P}_{C,REF}$ when the acoustic source 22 is at the reference position $\underline{P}_{0,REF}$).

The microphones $M_1$, $M_2$, $M_3$, and $M_4$ are at positions $P_1$, $P_2$, $P_3$, and $P_4$ with associated position vectors $\underline{P}_1$, $\underline{P}_2$, $\underline{P}_3$, and $\underline{P}_4$, respectively. $\underline{P}_1$, $\underline{P}_2$, $\underline{P}_3$, and $\underline{P}_4$ each have a component along each of the X, Y, and Z axes. While FIG. 1 shows the microphones $M_1$, $M_2$, $M_3$, and $M_4$ to be positioned in a particular geometric arrangement on a surface of the display device 12, the microphones $M_1$, $M_2$, $M_3$, and $M_4$ may be in any geometric arrangement relative to one another such that no three of $M_1$, $M_2$, $M_3$, and $M_4$ are colinear. Each of the microphones $M_1$, $M_2$, $M_3$, and $M_4$ may be independently located on, within, or outside of the display device 12.

The computing system 30 may comprise at least one semiconductor chip that has hardware-encoded algorithms. Alternatively, the computing system 30 may comprise a memory and processor (e.g., a computer) for storing and executing software, respectively. The computing system 30 is electrically coupled to the cursor 40 through an electrical path 32 (e.g., electrical wiring), which enables the computing system 30 to control the motion and position of the cursor 40. While FIG. 1 shows the computing system 30 to be located within the display device 12, the computing system 30 could be located on, within, or outside of the display device 12.

The acoustic source 22 continuously generates and propagates the acoustic signal 28. The microphones $M_1$, $M_2$, $M_3$, and $M_4$ are each adapted to detect the acoustic signal 28. The acoustic signal 28 detected at the microphones $M_i$ is adapted to be converted to a periodic electrical signal (e.g., an alternating current sinusoidal signal) $S_i$ for i=1, 2, 3, and 4. Each electrical signal of the electrical signals $S_1$, $S_2$, $S_3$, and $S_4$ is phase-shifted with respect to another signal of the electrical signals $S_1$, $S_2$, $S_3$, and $S_4$, as a consequence of the difference in magnitude of the distance between the acoustic source 22 at the position $P_0$ and each of the positions $P_1$, $P_2$, $P_3$, and $P_4$ of the microphones $M_1$, $M_2$, $M_3$, and $M_4$, respectively.

The electrical signals $S_1$, $S_2$, $S_3$, and $S_4$ so generated are each electrically coupled to the computing system 30. If the pointing device 20 has been moved to the position $P_0$ corresponding to the associated position vector $\underline{P}_0$, then the cursor 44 must be moved to its position $P_C$ corresponding to its associated position vector $\underline{P}_C$. The computing system 30 is adapted to calculate the position vector $\underline{P}_0$ of the acoustic source 22, by processing the electrical signals $S_1$, $S_2$; $S_3$, and $S_4$. For example, the computing system 30 may calculate $\underline{P}_0$ by solving the triangulation equations $$|\underline{P}_1 - \underline{P}_0| - |\underline{P}_j - \underline{P}_0| = C\Delta T_{1j}$$

for j=2, 3, and 4. $\Delta T_{ij}$ is defined as a phase-shift time delay between electrical signals $S_1$ and $S_j$, for: i=1, 2, 3, 4; j=1, 2, 3, 4; and i≠j. C is the speed of the acoustic signal 28 in the ambient atmosphere. Equations (1) comprise three equations corresponding to j=2, 3, and 4, which may be solved simultaneously for the three unknowns $P_{0X}$, $P_{0Y}$, and $P_{0Z}$ by any computational method known to a person of ordinary skill in the art of numerical analysis and computation. The unknowns $P_{0X}$, $P_{0Y}$, and $P_{0Z}$ are the components of the position vector $\underline{P}_0$ along the X, Y, and Z axes, respectively. Note that the scope of the present invention includes any mathematically equivalent form of Equations (1), and includes any other applicable triangulation technique known to a person of ordinary skill in the art. If the computing system 30 comprises at least one semiconductor chip, then the solution to Equations (1) may be hardware-encoded within the at least one semiconductor chip. If the computing system 30 comprises a memory and processor (e.g., a computer), then a solution algorithm for Equations (1) may be stored as software (e.g., as a computer program) in said memory and said software may be executed by said processor.

Following calculation of the position vector $\underline{P}_0$ of the acoustic source 22, the vector position $\underline{P}_C$ of the cursor 44 is calculated via the equations $$P_{CX} = P_{CX,REF} + A_X(P_{0X} - P_{0X,REF}) \quad (2A)$$

$$P_{CY} = P_{CY,REF} + A_Y(P_{0Y} - P_{0Y,REF}) \quad (2B)$$

$$P_{CZ} = P_{CZ,REF} + A_Z(P_{0Z} - P_{0Z,REF}) + (Z_S(P_{CX}, P_{CY}) - P_{CZ,REF}) \quad (2C)$$

$P_{CX}$, $P_{CY}$, and $P_{CZ}$ are the components of $\underline{P}_C$ along the X, Y, and Z axes, respectively. $P_{CX,REF}$ and $P_{CY,REF}$ and $P_{CZ,REF}$ are the components of $\underline{P}_{C,REF}$ along the X, Y, and Z axes, respectively. $P_{0X,REF}$ and $P_{0Y,REF}$ and $P_{0Z,REF}$ are the components of $\underline{P}_{0,REF}$ along the X, Y, and Z axes, respectively. $P_{CZ,REF}$ is assumed to describe a reference coordinate of the cursor 44 on the surface of the display screen 14. $Z_S(P_{CX}, P_{CY})$ is the Z coordinate of the cursor 44 on the surface of the display screen 14 at $P_{CX}$ and $P_{CY}$ (i.e., at the X and Y coordinates of the cursor 44). Generally, $Z_S(X,Y)$ is the Z coordinate of the surface of the display screen 14 as a function of X and Y. Thus, $Z_S(X,Y)$ is a "shape function" the display screen 14. If the display screen 14 is planar, then $Z_S(P_{CX}, P_{CY}) = P_{CZ,REF}$ (i.e., the shape function is "flat") and Equation (2C) for $P_{CZ}$ simplifies to $P_{CZ} = C_{CZ,REF} + A_Z(P_{0Z} - P_{0Z,REF})$, which is of the same form as Equations (2A) and (2B) for $P_{CX}$ and $P_{CY}$, respectively. However, the display screen 14 may be non-planar such that $Z_S(X,Y)$ is not constant and $Z_S(P_{CX}, P_{CY}) \neq P_{CZ,REF}$ ((i.e., the shape function is "not flat"). The scope of the present invention includes any mathematically equivalent form of Equations (2A), (2B), and (2C).

Following calculation of $\underline{P}_C$, the cursor 44 is moved to the position $P_C$ in response to movement of the pointing device 20 to the position $P_0$. The physical motion of the cursor 44 to the position $P_C$ is accomplished by using any electronics and hardware that is known to a person of ordinary skill in the art. The quantities $A_X$, $A_Y$, and $A_Z$ are components of a scale vector $\underline{A}$ and are scale factors in the X, Y, and Z directions, respectively; i.e., the scale vector $\underline{A}$ governs the magnitude of the movement of the cursor 44 in response to the corresponding movement of the pointing device 20. In accordance with Equations (2A) and (2B), $A_X$ and $A_Y$ govern motion of the cursor 44 in the X-Y plane. In accordance with Equation (2C), $(Z_S(P_{CX}, P_{CY}) - P_{CZ,REF})$ is the change in the Z coordinate of the cursor 44 from the reference cursor Z-coordinate $P_{CZ,REF}$, due to the non-planarirty of the shape of the surface of the display screen 14. Also in accordance with Equation (2C), $A_Z$ governs motion of the cursor 44 in an "apparent depth" (i.e., along the Z axis). Since, the cursor 44 cannot physically move away from the display screen 14, the motion of the cursor 44 in the depth direction is apparent, rather than real, in light of the ability of human vision to perceive depth in relation to a visual image that appears on the display screen 14. The scale factors $A_X$, $A_Y$, and $A_Z$ may be constants that have been determined prior to the calculation of $\underline{P}_C$ via Equation (2A), (2B), and (2C). Alternatively, $A_X$, $A_Y$, and $A_Z$ may be spatially dependent in order to simulate scaling that varies with spatial location of the cursor 44.

As a first example, a scale factor $A_X$ of 0.5 cm/inch denotes that the cursor 44 moves 0.5 cm in the X direction per inch of movement of the acoustic source 22 (and thus also the pointing device 20) in the X direction. As a second example, a scale factor $A_X$ of 0.1 inch/inch denotes that the cursor 44 moves 0.1 inches in the X direction per inch of movement of the acoustic source 22 (and thus also the pointing device 20) in the X direction. As a third example, a scale factor $A_X$ of 600 pixels/inch denotes that the cursor 44 moves 600 pixels in the X direction per inch of movement of the acoustic source 22 (and thus also the pointing device 20) in the X direction. The preceding examples also apply analogously for $A_Y$ and $A_Z$ in relation to motion in the Y and Z directions, respectively, while recognizing that the depth motion of the cursor 44 in the Z direction is apparent motion rather than real motion.

The case of $A_Z = 0$ restricts all motion (i.e., real and apparent motion) of the cursor 44 to the surface of the display screen 14, with no motion in the depth direction (i.e., behind the display screen 14). Thus if $A_Z = 0$, any motion of the acoustic source 22 (and thus also the pointing device 20) in the Z direction (or the −Z direction) will have no effect on the position of the cursor 44 on the display screen 14. In order for the cursor 44 to have apparent motion away or toward the display screen 14, the condition $A_Z \neq 0$ must be satisfied.

The acoustic source 22 could generate the acoustic signal 28 at any acoustic frequencies. It is beneficial, however, for the acoustic source 22 to generate the acoustic signal 28 at frequencies above those frequencies that can be heard by a human being (i.e., above about 20 kHz). Additionally, the phase-shift time delay period $\Delta T_{ij}$ (defined supra) should be less than the period T of the acoustic signal 28 so that $\Delta T_{ij}$ could be unambiguously calculated from comparison of the electrical signals $S_1$ and $S_j$ (for j=2, 3, and 4). It is noted that sound travels in air at room temperature at a speed (C) of about 1100 ft/sec, so that a value of 1 ft for $(|\underline{P}_1 - \underline{P}_0| - |\underline{P}_2 - \underline{P}_0|)$ has an associated phase-shift time delay period $\Delta T_{12}$ of less than 1 msec (see Equation (1)). Since a frequency of 20 kHz has a period of 50 microseconds, the acoustic signal 28 should include at least two discrete frequencies. For example, a composite signal of two frequencies, whose periods are 47 microseconds and 49 microseconds, would have a period of about 2.3 msec. As another example, a composite signal of three frequencies, whose periods are 43 microseconds, 47 microseconds, and 49 microseconds, would have a period of about 99 msec. Thus, at frequencies of at least about 20 kHz, the acoustic signal 28 should have at least two frequency components. At frequencies of at least about 20 kHz with the acoustic signal 28 having at least three frequency components, the present invention would benefit from having the period T of the acoustic signal 28 substantially larger than the phase-shift time delay periods $\Delta T_{ij}$ (i=1, 2, 3 and j=1, 2, 3 and i$\neq$j).

If the microphones $M_1$, $M_2$, $M_3$, and $M_4$ are able to detect a range of acoustic frequencies, then the microphones $M_1$, $M_2$, $M_3$, and $M_4$ could potentially detect frequencies other than those frequencies present in the acoustic signal 28, which may cause erroneous calculations of the phase-shift time delay periods $\Delta T_{ij}$ (i=1, 2, 3 and j=1, 2, 3 and i$\neq$j). Accordingly, filters $F_1$, $F_2$, $F_3$, and $F_4$ (see FIG. 1) may be used to filter the electrical signals $S_1$, $S_2$, $S_3$, and $S_4$, respectively, so as to remove from $S_1$, $S_2$, $S_3$, and $S_4$ all frequency components except those frequency components present in the acoustic signal 28.

Although the embodiments described herein disclose four microphones, namely $M_1$, $M_2$, $M_3$, and $M_4$, the scope of the present invention includes N such microphones such that N$\geq$4. If N>4 then the extra N−4 microphones could be used to, inter alia, infer more than one value of the position $\underline{P}_0$ of the pointer device. Said multiple computed values of $\underline{P}_0$ could be averaged to such that the resulting average value of $\underline{P}_0$ has improved statistical accuracy as compared with $\underline{P}_0$ that would be inferred from exactly four microphones.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for moving a cursor on a display screen, comprising:
   providing a display device having the display screen;
   providing four microphones $M_1$, $M_2$, $M_3$, $M_4$ at fixed positions such that no three of $M_1$, $M_2$, $M_3$, and $M_4$ are colinear;
   providing a wireless pointing device having an acoustic source;
   moving the pointing device such that the acoustic source is moved to a position $P_0$ having an associated position vector $P_0$, wherein $P_0$ is yet to be calculated:
   propagating an acoustic signal from the acoustic source;
   detecting the acoustic signal at microphone $M_i$, for i=1, 2, 3, and 4;
   converting the acoustic signal detected at microphone $M_i$ to a periodic electrical signal $S_i$, for i=1, 2, 3, and 4;
   calculating $P_0$ by solving triangulation equations that comprise a dependence on a phase-shift time delay between $S_1$ and $S_j$, for j=2, 3, and 4;
   computing a position vector $P_C$ for the cursor, wherein $P_C$ depends on: $P_0$, a scale vector A, and a shape function of the display screen; and
   moving the cursor to a position $P_C$ associated with the position vector $P_C$.

2. The method of claim 1, wherein the display screen is planar.

3. The method of claim 1, wherein the display screen is non-planar.

4. The method of claim 1, wherein the four microphones are within or attached to the display device.

5. The method of claim 1, wherein the cursor is electrically coupled to a computing system, wherein $S_1$, $S_2$, $S_3$, and $S_4$, are each electrically coupled to the computing system, wherein solving the triangulation equations for $P_0$ is implemented byte computing system, and wherein computing $P_C$ is implemented by the computing system.

6. The method of claim 5, wherein the computing system is within or attached to the display device, and wherein the four microphones are within or attached to the display device.

7. The method of claim 5, wherein the computing system includes at least one chip, and wherein solving the triangulation equations and computing $P_C$ are hardware-encoded within the at least one semiconductor chip.

8. The method of claim 5, wherein the computing system includes a processor, memory, and software, wherein the software is stored in the memory, and wherein solving the triangulation equations and computing $P_C$ are implemented through executing the software by the processor.

9. The method of claim 1, wherein the pointing device comprises a mouse.

10. The method of claim 1, wherein the display device comprises a television.

11. The method of claim 1, wherein the display device comprises a computer monitor.

12. The method of claim 1, wherein the acoustic signal comprises a plurality of frequency components.

13. The method of claim 12, wherein each frequency component has a frequency of at least about 20 kHz.

14. The method of claim 12, further comprising filtering the electrical signal $S_i$, to remove from $S_i$ all frequency components except the plurality of frequency components, for i=1, 2, 3, and 4.

15. The method of claim 1, wherein the acoustic signal comprises at least three frequency components.

16. A system for moving a cutter on a display screen, comprising:
a display device having the display screen;
four microphones $M_1$, $M_2$, $M_3$ and $M_4$ at fixed positions such that no three of $M_1$, $M_2$, $M_3$, and $M_4$ are colinear;
a wireless pointing device having an acoustic source, wherein the acoustic source is located at a position $P_0$ having an associated position vector $P_0$, wherein the acoustic source is adapted to generate and propagate an acoustic signal, wherein the microphone $M_1$ is adapted to detect the acoustic signal, and wherein the acoustic signal detected at the microphone $M_1$ is adapted to be converted to a periodic electrical signal $S_i$, for i=1, 2, 3, and 4;
a computing system to which the cursor, $S_1$, $S_2$, $S_3$, and $S_4$ are each electrically coupled, wherein the computing system is adapted to calculate $P_0$ by solving triangulation equations that comprise a dependence on a phase-shift time delay between $S_1$, and $S_j$, for j=2, 3, and 4, and wherein the computing system is adapted to compute a position vector $P_C$ for the cursor such that $P_C$ depends on: $P_0$, a scale vector A, and a shape function of the display screen; and
means for moving the cursor to a position $P_C$ associated with the position vector $P_C$.

17. The system of claim 16, wherein the display screen is planar.

18. The system of claim 16, wherein the display screen is non-planar.

19. The system of claim 16, wherein the four microphones are within or attached to the display device.

20. The system of claim 16 wherein the computing system is within or attached to the display device, and wherein the four microphones are within or attached to the display device.

21. The system of claim 16, wherein the computing system includes at least one semiconductor chip, and wherein solving the triangulation equation and comprising $P_C$ are hardware-encoded within the at least one semiconductor chip.

22. The system of claim 16, wherein the computing system includes a processor, memory, and software, wherein the software is stored in the memory, and wherein solving the triangulation equations and computing $P_C$ are implemented through executing the software by the processor.

23. The system of claim 16, wherein the pointing device comprises a mouse.

24. The system of claim 16, wherein the display device comprises a television.

25. The system of claim 16, wherein the display device comprises a computer monitor.

26. The system of claim 16, wherein the acoustic signal comprises a plurality of frequency components.

27. The system of claim 26, wherein each frequency component has a frequency of at least about 20 kHz.

28. The system of claim 26, further comprising a filter adapted to remove from the electrical signal $S_1$ all frequency components except the plurality of frequency components, for i=1, 2, 3, and 4.

29. The system of claim 16, wherein the acoustic signal comprises at least three frequency components.

30. A pointing device, said pointing device being wireless, and comprising an acoustic source at a position $P_0$ having an associated position vector $P_0$:
wherein the acoustic source is adapted to generate aid propagate an acoustic signal that can be detected by each of four microphones $M_1$, $M_2$, $M_3$, and $M_4$, at fixed positions such that no three of $M_1$, $M_2$, $M_3$, and $M_4$ are colinear;
wherein the acoustic signal at the microphone $M_i$, is adapted to be converted to a periodic electrical signal $S_i$ that is coupled to a computing system, for i=1, 2, 3, and 4;
wherein the computing system is adapted to calculate $P_0$ by solving triangulation equations that comprise a dependence on a phase-shift time delay between $S_1$, and $S_j$, for j=2, 3, and 4; and
wherein the computing system is adapted to compute a position vector $\underline{P}_C$ for a cursor on a display screen such that Pdepends on $P_0$, a scale vector A, and a shape function of the display. screen.

31. The pointing device of claim 30, wherein the display screen is planar.

32. The pointing device of claim 30, wherein the display screen is non-planar.

33. The pointing device of claim 30, wherein the four microphones are within or attached to the display device.

34. The pointing device of claim 30 wherein the computing system is within or attached to the display device, and wherein the four microphones are within or attached to the display device.

35. The pointing device of claim 30, wherein the computing system includes at least one semiconductor chip, and wherein solving the triangulation equations and computing $P_C$ me hardware-encoded within the at least one semiconductor chip.

36. The pointing device of claim 30, wherein the computing system includes processor, memory, and software, wherein the software is stored in the memory, and wherein solving the triangulation equations and computing $P_C$, are implemented through executing the software by the processor.

37. The pointing device of claim 30, wherein the pointing device comprises a mouse.

38. The pointing device of claim 30, wherein the display device comprises a television.

39. The pointing device of claim 30, wherein the display device comprises a computer monitor.

40. The pointing device of claim 30, wherein the acoustic signal comprises a plurality of frequency components.

41. The pointing device of claim 40, wherein each frequency component has a frequency of at least about 20 kHz.

42. The pointing device of claim 30, wherein the acoustic signal comprises at least three frequency components.

43. The pointing device of claim 42, wherein each frequency component has a frequency of at least about 20 kHz.

* * * * *